United States Patent
King et al.

(10) Patent No.: US 8,150,967 B2
(45) Date of Patent: Apr. 3, 2012

(54) SYSTEM AND METHOD FOR VERIFIED PRESENCE TRACKING

(75) Inventors: Simon P King, Berkeley, CA (US); Marc Eliot Davis, San Francisco, CA (US); Christopher William Higgins, Portland, OR (US)

(73) Assignee: Yahoo! Inc., Sunnyvale, CA (US)

( * ) Notice: Subject to any disclaimer, the term of this patent is extended or adjusted under 35 U.S.C. 154(b) by 259 days.

(21) Appl. No.: 12/409,867

(22) Filed: Mar. 24, 2009

(65) Prior Publication Data

US 2010/0250727 A1   Sep. 30, 2010

(51) Int. Cl.
G06F 15/173 (2006.01)
(52) U.S. Cl. .................................................... 709/224
(58) Field of Classification Search .................... 709/224
See application file for complete search history.

(56) References Cited

U.S. PATENT DOCUMENTS

| | | |
|---|---|---|
| 5,446,891 A | 8/1995 | Kaplan et al. |
| 5,493,692 A | 2/1996 | Theimer et al. |
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |
| 5,835,087 A | 11/1998 | Herz |
| 5,903,848 A | 5/1999 | Takahashi |
| 5,920,854 A | 7/1999 | Kirsch et al. |
| 6,014,638 A | 1/2000 | Burge et al. |
| 6,021,403 A | 2/2000 | Horvitz et al. |
| 6,047,234 A | 4/2000 | Cherveny et al. |
| 6,098,065 A | 8/2000 | Skillen et al. |
| 6,112,181 A | 8/2000 | Shear et al. |
| 6,157,924 A | 12/2000 | Austin |
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |

(Continued)

FOREIGN PATENT DOCUMENTS

EP    1362302    11/2003

(Continued)

OTHER PUBLICATIONS

U.S. Appl. No. 12/273,259, filed Dec. 6, 2007, Davis.

(Continued)

*Primary Examiner* — Jerry Dennison
(74) *Attorney, Agent, or Firm* — James J. DeCarlo; Greenberg Traurig, LLP

(57) ABSTRACT

A system and method for verified presence tracking. A request for a location is received over a network. The request comprises a request type, a request source and at least one request target. Location data relating to the request targets is retrieved from a plurality of location data sources. The reliability of the retrieved location data is determined. A response is formulated using based on the request type, the retrieved location data, and the determined reliability of the retrieved location data. The response is then transmitted over the network to the request source.

42 Claims, 3 Drawing Sheets

U.S. PATENT DOCUMENTS

| | | |
|---|---|---|
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Maker et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez |
| 7,769,745 B2 | 8/2010 | Mor Naaman |
| 7,783,622 B1 | 8/2010 | Vandermolen et al. |
| 7,792,040 B2 | 9/2010 | Nair |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052785 A1 | 5/2002 | Smith et al. |
| 2002/0052786 A1 | 5/2002 | Kim et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abajian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |

| | | | | | |
|---|---|---|---|---|---|
| 2005/0076060 A1 | 4/2005 | Finn et al. | 2007/0136689 A1 | 6/2007 | Richardson-Bunbury et al. |
| 2005/0086187 A1 | 4/2005 | Grosser et al. | 2007/0143345 A1 | 6/2007 | Jones et al. |
| 2005/0105552 A1 | 5/2005 | Osterling | 2007/0150168 A1 | 6/2007 | Balcom et al. |
| 2005/0108213 A1 | 5/2005 | Riise et al. | 2007/0150359 A1 | 6/2007 | Lim et al. |
| 2005/0120006 A1 | 6/2005 | Nye | 2007/0155411 A1 | 7/2007 | Morrison |
| 2005/0131727 A1 | 6/2005 | Sezan | 2007/0161382 A1 | 7/2007 | Melinger et al. |
| 2005/0149397 A1 | 7/2005 | Morgernstern et al. | 2007/0162850 A1 | 7/2007 | Adler |
| 2005/0151849 A1 | 7/2005 | Fitzhugh et al. | 2007/0168430 A1 | 7/2007 | Brun et al. |
| 2005/0159220 A1 | 7/2005 | Wilson et al. | 2007/0173266 A1 | 7/2007 | Barnes |
| 2005/0159970 A1 | 7/2005 | Buyukkokten et al. | 2007/0179792 A1 | 8/2007 | Kramer |
| 2005/0160080 A1 | 7/2005 | Dawson | 2007/0185599 A1 | 8/2007 | Robinson et al. |
| 2005/0165699 A1 | 7/2005 | Hahn-Carlson | 2007/0192299 A1 | 8/2007 | Zuckerberg et al. |
| 2005/0166240 A1 | 7/2005 | Kim | 2007/0198506 A1 | 8/2007 | Attaran Rezaei et al. |
| 2005/0171955 A1 | 8/2005 | Hull et al. | 2007/0198563 A1 | 8/2007 | Apparao et al. |
| 2005/0177385 A1 | 8/2005 | Hull et al. | 2007/0203591 A1 | 8/2007 | Bowerman |
| 2005/0182824 A1 | 8/2005 | Cotte | 2007/0219708 A1 | 9/2007 | Brasche et al. |
| 2005/0183110 A1 | 8/2005 | Anderson | 2007/0233585 A1 | 10/2007 | Ben Simon et al. |
| 2005/0187786 A1 | 8/2005 | Tsai | 2007/0239348 A1 | 10/2007 | Cheung |
| 2005/0192025 A1 | 9/2005 | Kaplan | 2007/0239517 A1 | 10/2007 | Chung et al. |
| 2005/0203801 A1 | 9/2005 | Morgenstern et al. | 2007/0259653 A1 | 11/2007 | Tang et al. |
| 2005/0216295 A1 | 9/2005 | Abrahamsohn | 2007/0260508 A1 | 11/2007 | Barry et al. |
| 2005/0216300 A1 | 9/2005 | Appelman et al. | 2007/0260604 A1 | 11/2007 | Haeuser et al. |
| 2005/0219375 A1 | 10/2005 | Hasegawa et al. | 2007/0271297 A1 | 11/2007 | Jaffe et al. |
| 2005/0234781 A1 | 10/2005 | Morgenstern | 2007/0271340 A1 | 11/2007 | Goodman et al. |
| 2005/0273510 A1 | 12/2005 | Schuh | 2007/0273758 A1 | 11/2007 | Mendoza et al. |
| 2006/0020631 A1 | 1/2006 | Cheong Wan et al. | 2007/0276940 A1* | 11/2007 | Abraham et al. ............ 709/224 |
| 2006/0026013 A1 | 2/2006 | Kraft | 2007/0282621 A1 | 12/2007 | Altman et al. |
| 2006/0026067 A1 | 2/2006 | Nicholas et al. | 2007/0282675 A1 | 12/2007 | Varghese |
| 2006/0031108 A1 | 2/2006 | Oran | 2007/0288278 A1 | 12/2007 | Alexander et al. |
| 2006/0040719 A1 | 2/2006 | Plimi | 2008/0005313 A1* | 1/2008 | Flake et al. ................... 709/224 |
| 2006/0047563 A1 | 3/2006 | Wardell | 2008/0005651 A1 | 1/2008 | Grefenstette et al. |
| 2006/0047615 A1 | 3/2006 | Ravin | 2008/0010206 A1 | 1/2008 | Coleman |
| 2006/0053058 A1 | 3/2006 | Hotchkiss et al. | 2008/0021957 A1 | 1/2008 | Medved et al. |
| 2006/0069612 A1 | 3/2006 | Hurt et al. | 2008/0026804 A1 | 1/2008 | Baray et al. |
| 2006/0069616 A1 | 3/2006 | Bau | 2008/0028031 A1 | 1/2008 | Bailey et al. |
| 2006/0069749 A1 | 3/2006 | Herz et al. | 2008/0040283 A1 | 2/2008 | Morris |
| 2006/0074853 A1 | 4/2006 | Liu et al. | 2008/0046298 A1 | 2/2008 | Ben-Yehuda et al. |
| 2006/0085392 A1 | 4/2006 | Wang et al. | 2008/0070588 A1 | 3/2008 | Morin |
| 2006/0085419 A1 | 4/2006 | Rosen | 2008/0086356 A1 | 4/2008 | Glassman et al. |
| 2006/0089876 A1 | 4/2006 | Boys | 2008/0086431 A1 | 4/2008 | Robinson et al. |
| 2006/0116924 A1 | 6/2006 | Angeles et al. | 2008/0091796 A1 | 4/2008 | Story et al. |
| 2006/0123053 A1 | 6/2006 | Scannell, Jr. | 2008/0096664 A1 | 4/2008 | Baray et al. |
| 2006/0129313 A1 | 6/2006 | Becker | 2008/0102911 A1 | 5/2008 | Campbell et al. |
| 2006/0129605 A1 | 6/2006 | Doshi | 2008/0104061 A1 | 5/2008 | Rezaei |
| 2006/0161894 A1 | 7/2006 | Oustiougov et al. | 2008/0104227 A1 | 5/2008 | Birnie et al. |
| 2006/0168591 A1 | 7/2006 | Hunsinger et al. | 2008/0109761 A1 | 5/2008 | Stambaugh |
| 2006/0173838 A1 | 8/2006 | Garg et al. | 2008/0109843 A1 | 5/2008 | Ullah |
| 2006/0173985 A1 | 8/2006 | Moore | 2008/0114751 A1 | 5/2008 | Cramer et al. |
| 2006/0178822 A1 | 8/2006 | Lee | 2008/0120183 A1 | 5/2008 | Park |
| 2006/0184508 A1 | 8/2006 | Fuselier et al. | 2008/0120308 A1 | 5/2008 | Martinez et al. |
| 2006/0184579 A1 | 8/2006 | Mills | 2008/0120690 A1 | 5/2008 | Norlander et al. |
| 2006/0212330 A1 | 9/2006 | Savilampi | 2008/0133750 A1 | 6/2008 | Grabarnik et al. |
| 2006/0212401 A1 | 9/2006 | Amerally et al. | 2008/0147655 A1 | 6/2008 | Sinha et al. |
| 2006/0227945 A1 | 10/2006 | Runge et al. | 2008/0147743 A1 | 6/2008 | Taylor et al. |
| 2006/0235816 A1 | 10/2006 | Yang et al. | 2008/0148175 A1 | 6/2008 | Naaman et al. |
| 2006/0236257 A1 | 10/2006 | Othmer et al. | 2008/0154720 A1 | 6/2008 | Gounares |
| 2006/0242139 A1 | 10/2006 | Butterfield et al. | 2008/0163284 A1 | 7/2008 | Martinez et al. |
| 2006/0242178 A1 | 10/2006 | Butterfield et al. | 2008/0172632 A1 | 7/2008 | Stambaugh |
| 2006/0242259 A1 | 10/2006 | Vallath et al. | 2008/0177706 A1 | 7/2008 | Yuen |
| 2006/0258368 A1 | 11/2006 | Granito et al. | 2008/0270579 A1 | 10/2008 | Herz et al. |
| 2006/0282455 A1 | 12/2006 | Lee | 2008/0285886 A1 | 11/2008 | Allen |
| 2007/0013560 A1 | 1/2007 | Casey | 2008/0301250 A1 | 12/2008 | Hardy et al. |
| 2007/0015519 A1 | 1/2007 | Casey | 2008/0320001 A1 | 12/2008 | Gaddam |
| 2007/0043766 A1 | 2/2007 | Nicholas et al. | 2009/0005987 A1 | 1/2009 | Vengroff et al. |
| 2007/0067104 A1 | 3/2007 | Mays | 2009/0006336 A1 | 1/2009 | Forstall et al. |
| 2007/0067267 A1 | 3/2007 | Ives | 2009/0012934 A1 | 1/2009 | Yerigan |
| 2007/0072591 A1 | 3/2007 | McGary et al. | 2009/0012965 A1 | 1/2009 | Franken |
| 2007/0073583 A1 | 3/2007 | Grouf et al. | 2009/0043844 A1 | 2/2009 | Zimmet et al. |
| 2007/0073641 A1 | 3/2007 | Perry et al. | 2009/0044132 A1 | 2/2009 | Combel et al. |
| 2007/0086061 A1 | 4/2007 | Robbins | 2009/0063254 A1 | 3/2009 | Paul et al. |
| 2007/0087756 A1 | 4/2007 | Hoffberg | 2009/0070186 A1 | 3/2009 | Buiten et al. |
| 2007/0088852 A1 | 4/2007 | Levkovitz | 2009/0073191 A1 | 3/2009 | Smith et al. |
| 2007/0100956 A1 | 5/2007 | Kumar | 2009/0076889 A1 | 3/2009 | Jhanji |
| 2007/0112762 A1 | 5/2007 | Brubaker | 2009/0100052 A1 | 4/2009 | Stern et al. |
| 2007/0121843 A1 | 5/2007 | Atazky et al. | 2009/0106356 A1 | 4/2009 | Brase et al. |
| 2007/0130137 A1 | 6/2007 | Oliver et al. | 2009/0125517 A1 | 5/2009 | Krishnaswamy et al. |
| 2007/0136048 A1 | 6/2007 | Richardson-Bunbury et al. | 2009/0132941 A1 | 5/2009 | Pilskalns et al. |
| 2007/0136235 A1 | 6/2007 | Hess | 2009/0144141 A1 | 6/2009 | Dominowska et al. |
| 2007/0136256 A1 | 6/2007 | Kapur et al. | 2009/0150501 A1 | 6/2009 | Davis et al. |

| | | | |
|---|---|---|---|
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1 | 8/2009 | Coffman et al. | |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1 | 9/2009 | Strandeil et al. | |
| 2009/0249482 A1 | 10/2009 | Sarathy | |
| 2009/0265431 A1 | 10/2009 | Janie et al. | |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0118025 A1 | 5/2010 | Smith et al. | |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |

FOREIGN PATENT DOCUMENTS

| | | |
|---|---|---|
| JP | 2002312559 | 10/2002 |
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/952,007, filed Dec. 6, 2007, Davis.
U.S. Appl. No. 11/953,454, filed Dec. 10, 2007, Davis.
U.S. Appl. No. 11/953,494, filed Dec. 10, 2007, Davis.
U.S. Appl. No. 12/059,594, filed Mar. 31, 2008, Martinez.
U.S. Appl. No. 12/236,668, filed Sep. 24, 2008, Davis.
U.S. Appl. No. 12/057,943, filed Mar. 28, 2008, Martinez.
U.S. Appl. No. 12/057,878, filed Mar. 28, 2008, Martinez.
U.S. Appl. No. 11/969,751, filed Jan. 4, 2008, Martinez.
U.S. Appl. No. 12/163,249, filed Jun. 27, 2008, Kalaboukis.
U.S. Appl. No. 12/145,145, filed Jun. 24, 2008, Davis.
U.S. Appl. No. 12/182,813, filed Jul. 30, 2008, Higgins.
U.S. Appl. No. 12/182,969, filed Jun. 27, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
U.S. Appl. No. 11/593,668, filed Nov. 6, 2006 for Naaman, et al.
U.S. Appl. No. 11/593,869, filed Nov. 6, 2006 for Naaman, et al.
"Gutenkarte" Book Catalog, 2006 MetaCarta, Inc., www.gutenkarte. org 11pgs.
Baron, N.S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/>, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h > . . . , last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . ,> last visited on Feb. 2, 2010, seventeen pages.
Wooldridge, M. et al. (2005). "STALK. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.
Anonymous. (Date Unknown). "Google Earth User Guide—Using Image Overlays and 3D Models," located at <http://earth.google.com/userguide/v4/ug_imageoverlays.html >, nine pages.
Anonymous. (Date Unknown). "Google Maps," located at <http://en.wikipedia.org/wiki/Google_maps >, last visited on Feb. 27, 2008, eleven pages.
Anonymous. (Date Unknown). "Live Search Maps," located at <http://en.wikipedia.org/wiki/Windows_live_maps >, last visited on Mar. 3, 2008, six pages.
Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.
Anonymous. (2007). "Wayfaring Follow You, Follow Me," located at <http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous. (2008). "Wikimpaia.org ," located at <http://wikimpaia.org/>, last visited on Mar. 3, 2008, one page.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.

U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.
Allen James F., "Maintaining Knowledge About Temporal Intervals", Communications of the ACM, Nov. 1983, vol. 26, No. 11 pp. 832-843; 12 pages.
Press Release, "QUALCOMM Conducts First Live Demonstration of FL Technology on a Wireless Handset", Qualcomm Inc., San Diego, Sep. 27, 2005; 3 pages.
MediaFlo, FLO Technology Overview, Qualcomm Inc. Copyright 2007; 24 pages.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006, vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.
"Companies add new communication features to photo sharing.", Digital Imaging Digest, Feb. 2006, pp. 1-2.
"Dave.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Notification of Transmittal of the International Search Report and The Written Opinion of the International Search Authority, or Declaration (PCT/US2007/'084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.

Rekimoto, et al., "CyberCode: designing augmented reality environments with visual tags." Proceedings of DARE 2000 on Designing augmented reality environments, Elsinore, Denmark, pp. 1-11 Apr. 12-14, 2000.
"Semacode-URL Barcodes-practical ubiquitous computing", located at http://semacode.org visited on Apr. 13, 2007; 3 pages.
"Technical White Paper: Choosing the best 2D barcode format for mobile apps," Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification." 10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&Ir=&9=cache:vbwslsm1CisJ:www.openu.acil/Personal_sites/tarnirtassa/Publications/hcm.pdf+goldberger+clustering+method+hungarian> visited on Mar. 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In On the Move to Meaningful Internet Systems 2003: Coop/S, DOA, and Odbase R. Meersman et al. eds., pp. 196-217.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.
Nair, R. et al. (Nov. 6-11, 2005). "Photo L01: Browsing Multi-User Photo Collections," MM'05 Singapore, pp. 223-224.
O'Hare, N. et al. "Combination of Content Analysis and Context Features for Digital Photograph Retrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarvas, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM '03'Berkeley: California. 12 pages.
Nedos, A; Singh K., Clarke S, Proximity Based Group Communications for Mobile Ad Hoc Networks; Proximity-Based Group Communication; Global Smart Spaces; D.14; Oct. 3, 2003; 31 pages.

Brunato, M; Battiti R. "Pilgrim: A Location Broker and Mobility-Aware Recommendation System"; Technical report DIT-02-0092, Universita di Trento, Oct. 2002; 8 pages.

Backstrom et al., Spatial Variation in Search Engine Queries, WWW•2008, Beijing, China (Apr. 21-25, 2008).

Gan et al., Analysis of Geographic Queries in a Search Engine Log, LocWeb 2008, Beijing, China (Apr. 22, 2008).

Jones et al., Geographic Intention and Modification in Web Search, International Journal of Geographical Information Science, vol. 22, No. 3, pp. 1-20 (Jul. 2008).

Sanderson et al., Analyzing Geographic Queries; Department of Information Studies; University of Sheffield, UK; 2 pages.

Go With the Flow, The Economist Technology Quarterly, vol. 382, Issue 8519, 4 pages, (Mar. 10, 2007).

International Search Report and Written Opinion (PCT/US2009/060476) dated May 4, 2010; 12 pages.

International Search Report and Written Opinion (PCT/US2009/060374) dated Apr. 30, 2010; 12 pages.

International Search Report (PCT/US2009/060379) dated Apr. 30, 2010; 3 pages.

International Search Report and Written Opinion (PCT/US2008/085135) dated May 25, 2009; 7 pages.

International Search Report (PCT/US2009/055503) dated Apr. 8, 2010; 3 pages.

Written Opinion (PCT/US2008/085915) dated Jun. 29, 2009; 4 pages.

Written Opinion (PCT/US2008/086948) dated May 21, 2009; 5 pages.

International Search Report and Written Opinion (PCT/US2009/051247) dated Jan. 25, 2010; 9 pages.

International Search Report and Written Opinion (PCT/US2009/046258) dated Dec. 23, 2009; 7 pages.

Almieda, R.B. et al. "A Community-Aware Search Engine," WWW2004, New York., NY, May 17-22, 2004, pp. 413-421.

Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.

Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.

Bharat, K. (Date Unknown). "SearchPad: Explicit Capture of Search Context to Support Web Search," located at <http://www9.org/w9cdrom/173/173.html >, last visited Aug. 1, 2007, 13 pages.

Budzik, J. et al. (2000). "User Interactions with Everyday Applications as Context for Just-in-Time Information Access," Proceeding of the 2000 Conference on Intelligent User Interfaces, eight pages.

Finkelstein, L. et al. (2001). "Placing Search in Context: The Concept Revisited," WWW/O, Hong Kong, May 2-5, 2001, pp. 406-414.

Freyne, J. et al. (2004). "Further Experiments on Collaborative Ranking in Community-Based Web Search," Artificial Intelligence Review, pp. 1-23.

Lieberman, H. (1995) "Letizia: An Agent that Assists Web Browsing," Proceedings of the Fourteenth International Joint Conference on Artificial Intelligence, Aug. 20-25, 1995, six pages.

Mitra, M. et al. (1998). "Improving Automatic Query Expansion," Proceedings of the AMC SIGIR, nine pages.

Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent...>, last visited Aug. 1, 2007, six pages.

Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.

Yahoo! Inc. (Dec. 7, 2005). "Yahoo! Widget Engine 3.0 Reference Manual Version 3.0," 300 pages.

U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
U.S. Appl. No. 12/241,590, filed Sep. 30, 2008, Athsani.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.

* cited by examiner

SYSTEM AND METHOD FOR VERIFIED PRESENCE TRACKING

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for tracking the location of users and devices and, more particularly, to systems and methods where the location of users and devices is verified using multiple sensors and other sources of location data.

BACKGROUND OF THE INVENTION

For a variety of reasons it may be necessary or useful to know the location history of a user with varying degrees of certainty. In some instances it may be enough to use the user's stated location (i.e. where the user says he or she is.) For example, location information a user shares with friends or relatives can use stated location. The user, however, user may later wish to view their own location history and see where they actually were, rather than where they said they were. In other instances a higher degree of reliability may be required, for example if user presence is used to modify media access rights (e.g., share event photos only to people who attended the event). Location data can be obtained from a variety of sources such as, for example, a user's cell phone location, however, such sources taken singly may be insufficiently precise or of questionable, or unknown, reliability.

SUMMARY OF THE INVENTION

In one embodiment, the invention is a method. A request for a location is received over a network. The request comprises a request type, a request source and at least one request target. The relationship of the request source to the request target is used as part of the determination. Location data relating to the request targets is retrieved from a plurality of location data sources. The reliability of the retrieved location data is determined using the computing device. A response is formulated using the computing device based on the request type, the retrieved location data, and the determined reliability of the retrieved location data. The response is then transmitted over the network to the request source.

In another embodiment, the invention is a method. A request for a location is received over a network. The request comprises a request type, a request source and at least one request target. The relationship of the request source to the request target is determined using at least one computing device. A level of access to location data the source is allowed relative to the at least one request target is determined using the computing device. The relationship of the request source to the request target is used as part of the determination. Location data relating to the request targets is retrieved from a plurality of location data sources. The reliability of the retrieved location data is determined using the computing device. A response is formulated using the computing device based on the request type, the retrieved location data, and the determined reliability of the retrieved location data. The response is then transmitted over the network to the request source.

In another embodiment, the invention is a system comprising: a location request manager that is configured to receive, over a network, requests for a location, wherein each request comprises a request type, a request source and at least one request target; a location tracking manager that retrieves, over a network, for each request for a location received by the location request manager, location data relating to the request targets from a plurality of location data sources; a confidence manager that determines the reliability of location data retrieved by the location tracking manager, wherein the location request manager is further configured to formulate a response to each request for a location using location data retrieved by the location tracking manager, the formulated response based on the request type, the retrieved location data, and the reliability of the retrieved location data, wherein the location request manager is further configured to transmit responses formulated for a request for a location to the request's respective source.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
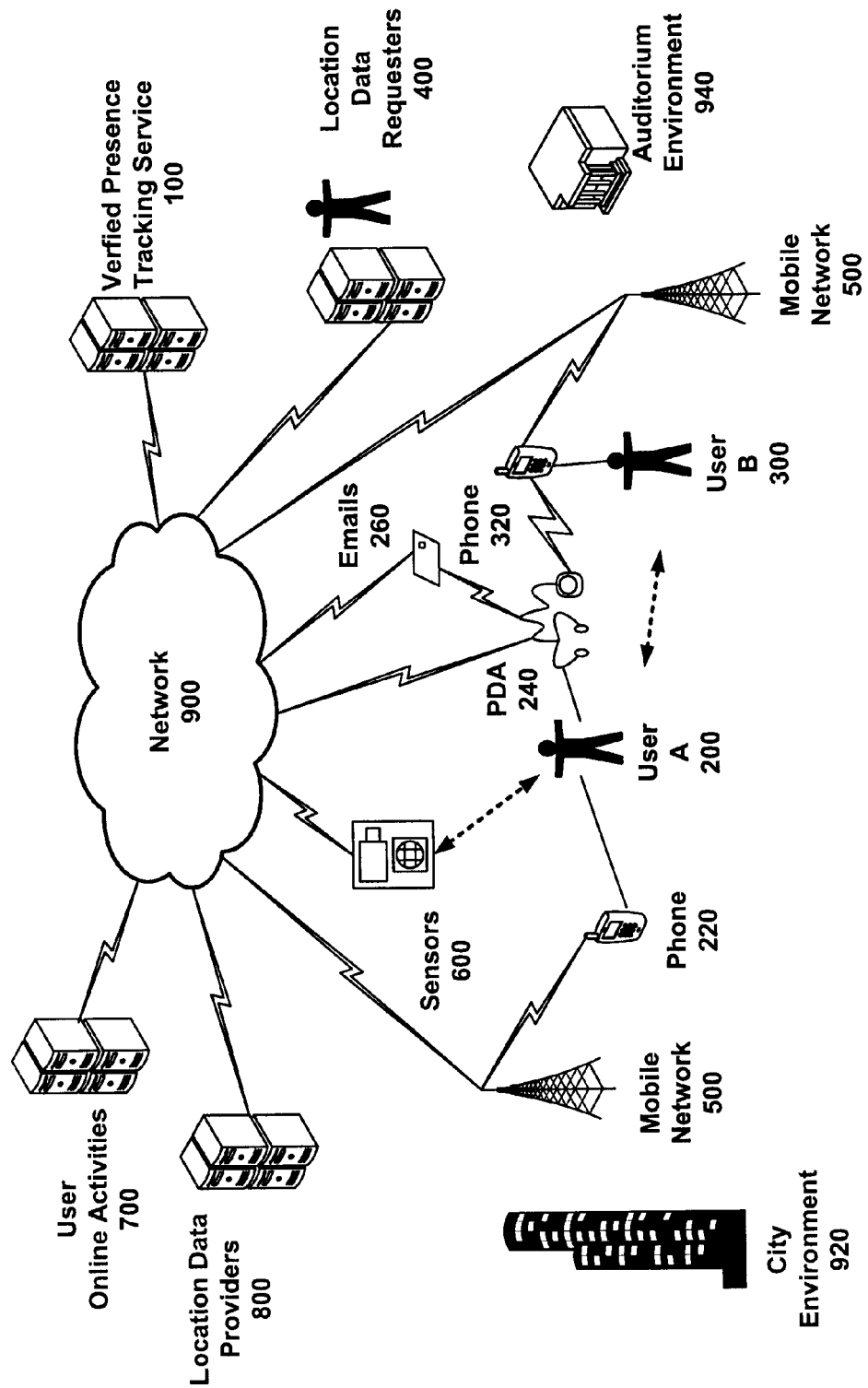
FIG. 1 illustrates one embodiment of communications and sensor networks that could be used to support at least one embodiment of the present invention.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine, a manager or an application.

In one embodiment, the present invention is directed to a verified presence tracking system that tracks the locations of users using multiple sources for location data. Such sources can include various types of sensors, data supplied by other users and third party location data providers. Using a variety of sensor and user inputs, the verified presence tracking system can track users' locations with varying degrees of confidence, scoring available corroborative data by source and reliability and, when necessary, authenticating the presence of one or more users at a location by seeking additional corroborating sensors to actively verify and certifying both user identity and user location/proximity data.

FIG. 1 illustrates one embodiment of communications and sensor networks that could be used to support at least one embodiment of the present invention.

A verified presence tracking service 100 is hosted on at least one server. The server is connected to at least one network 900 through which the verified presence tracking service can receive location and location verification data as well as location data requests regarding a plurality of users, such as User A 200 and User B 300. In one embodiment, the network 900 includes connectivity to the Internet, and can additionally include connectivity to one or mobile networks 500 and one or more wireless or wireline sensor networks 600. Sensor networks may be physically or logically organized into networks across various telecommunications or communication networks.

In one embodiment, the verified presence tracking service is configured to receive location data requests from one or more location data requesters 400. Such location data requesters 400 could be individual users such as User A 200 and User B 300. Such location data requesters 400 could be organizations, such as retailers and service providers that use location data for commercial purposes, such as promotion verification. Such location data requesters 400 could be government entities, such as law enforcement agencies that use location data for law enforcement purposes, such as locating a missing person or tracking a fugitive. Location data requests can be submitted using any conventional technique capable of transmitting data over the Internet. In one embodiment, location requests can be submitted though a web enabled interface, such as an HTML page. In one embodiment, location requests can be submitted via software running on a user device using an API.

The data relating to the location of User A 200 and User B 300 can be obtained from a variety of sources including humans and devices such as cellular telephones, mobile computing or gaming devices, appliances or vending machines, private or public vehicles, private or public buildings and sensors. Location data could be a stated location by the user or the user's device. In the illustrated example, user A 200 may engage in various online activities 700 that can provide location data. For example, user A 200 belong to one or more user websites such as a social networking website (such as the Facebook website) or a microblogging site (such as the Twitter website.), personal blogs or websites may also contain content created or annotated by the user and published on an interconnected network for consumption and enjoyment by other users. The user's online activities 700 such as what web sites are visited, how long they are visited for, and what is clicked on or interacted with a pointing device such as a mouse or cursor may also be traced and stored by the user, a network or third-party service provider. User A 200 may explicitly post a status message to such sites indicating his or her current location or an intended destination or series of locations and associated times of expected presence (which could be remote in time.) User A may also send emails indicating the user's current location or intended destination as well as communicated interactively through speech or IM in real-time with other users such that all of these channels may be sources of data regarding user location or destination including weighting the reliability of specific data instances or values based upon entity extraction from communications before, during or after the location/time data seeking to be verified. The verified presence tracking service 100 could also provide means to allow a user to directly post a stated location for the service to use via, for example, a webpage or a text message.

Location data could be obtained from communications networks. In the illustrated example, User A 200 and User B 300 both have phones 220 and 320 connected to a mobile network such as a CDMA or GSM network. User A's Personal Data Assistant PDA 240 may also be connected to a wireless network The position of the user's devices 220, 240 and 320 could be determined or approximated using any conventional technique such as triangulation of cell signals or the location of the nearest cell tower. The user's devices 220, 240 and 320 could also include other sensors, such as GPS sensors which could provide a relatively precise geographical position as well as biometric or orientation-in-space data. Successive sets of data could be analyzed to determine a real-time rate and direction for any motion as well as to establish individual, archetype user and aggregated user patterns and trends, which becomes valuable data in weighting the reliability of future location data instances.

Location data could be obtained from sensor networks. In the illustrated example, User A 200 is within the sensing radius of one or more sensor 600. The sensors 600 could be any kind of sensor capable of identifying an individual with a reasonable degree of accuracy including but not limited to RFID tag readers, biometric sensors, motion sensors, temperature or weather sensors, access sensors, security sensors or multimedia stream sources including real-time feeds from on scene users with multimedia streaming or capture enabled devices, appliances, vehicles, buildings, etc. For example, the sensors 600 could be any kind of biometric sensors such as a facial recognition system or a fingerprint scanner. The sensors 600 could be scanning devices for user identification credentials, such as a drivers license. The sensors could be RFID sensors that sense RFID devices associated with a user through, for example, a user device such as a PDA 240 in which an RFID device is embedded. Other known RFID-imbedded devices include people, clothing, vehicles, jewelry and child or elderly protection or monitoring devices.

Location data for one user could be provided by another user. For example, A 200 user could similarly provide a stated location for another user. For example, User A 200 could post a status message to a website or send an email that indicates User B 300 is, or will be, in a specific place at a specific time. One user's device could recognize the presence of another user's device in a given location. For example, User A's PDA 240, could use a short range communication protocol such as the Bluetooth protocol, recognize that User B's phone 320 is within range of the PDA and transmit such information to the verified presence tracking service 100 through one or more networks 900. A user device could be used to request a user to explicitly verify the presence of another user in a given location. For example, the verified presence tracking service 100 could send an inquiry to User A 200 via a text message, an email or an instant messages requesting User A to verify that User B 300 is in a given location or co-present with one or more additionally specified users or objects.

Location data could also be provided through one or more third party location data providers 800. This may be necessary under circumstances where location data cannot be directly obtained from a communications or sensor network, such as foreign jurisdictions which strictly control location data for privacy or national security reasons. It may also be from local area sensor networks such as video feeds, local wifi or other presence or identity enabled processes, appliances or devices that sense and record users and/or their activities at one or more locations. For example, a theme park or access-controlled home owners association gather data on users and their locations, their comings and goings which may be offered in real-time or post-event to others on a free or fee-basis.

Thus location data can be obtained through a variety of sources. Such data may vary, however, widely in reliability and granularity. The reliability and granularity affect the uses to which location can be put. Some applications may have relatively permissive requirements. For example, if a user is curious as to where his or her friends are currently located or where they have traveled recently, it may be sufficient to know they are in, or have traveled through specific states, countries or cities, and it may not be particularly important if a significant portion of the data is inaccurate. By definition, a less granular picture of user location or path data has a lower reliability threshold, whereas a highly granular location or path request has a higher reliability based upon actual number of available sources of verifying location data corroboration data. Also, if location data is used for commercial purposes, such as confirming that a user went for a test drive at a particular car dealership or dined at a specific restaurant to satisfy the terms of an online coupon, location data needs to be very reliable and detailed enough to satisfy the requirements of the specific application. If location data is used for security purposes, such as locating a missing user, it must be of the highest possible reliability.

The reliability of location data depends broadly on the sources of the information and the circumstances under which the data is collected. One conceptual model for reliability of location data of a user could be stated as follows.

$$R_1 = C_L(P_1 S_1)$$

Where
  $R_1$ is the reliability of location data relating to User 1,
  $C_L$ is the reliability of the context in which the data is collected,
  $P_1$ is the reliability of User 1 supplying location data
  $S1$ is the reliability of the sensor associated with User 1 supplying location data The term "context" should be understood to refer broadly to the total set of circumstances under which location data is obtained. It includes, without limitation, the physical location of the user and the sensor, the date and time the data is obtained, environmental factors, such as weather, co-presence of other users, devices or sensors/networks, metadata associated with any and all of those as well as data forecasting the activities the user is engaged in, such as watching concerts, attending school, shopping, and so forth. As stated above, entity extraction from communications and analysis off individual and system-wide user locations and sensor value correlation enable a rich ability to model any form of activity for which data can be sensed.

For the purposes of this application, where the term "reliability" is used, it is understood that unless otherwise qualified, it refers to the reliability of a user, sensor, place, time and so forth as a source of location data. It is not intended to imply that a user, sensor, place is reliable or unreliable in any other, or broader sense.

The conceptual model above expresses the general principal that when location data regarding a specific user is obtained, the reliability is affected by a combination of the reliability of the user as a source of information, the reliability of the sensor from which location data is received and the reliability of the context under which the location data is obtained. If any one of the three is unreliable, location data may be suspect.

In one embodiment, reliability of a given user, sensor or context may be determined on a typological basis, on an empirical basis or both. A user may be assigned to one or more types or archetypes based on any number of factors that describe the user. Such factors may include demographic factors such as age, nationality, gender, income, wealth, educational level and profession. Such factors may include the user's interests such as a favorite type of music, literature, hobby or other activities. Such factors may include metrics about the user's behavior on the Internet, such as the number of social networking websites the user is a member of, the number and frequency status messages posted by the user, the number of emails sent by a user, original content or content annotations published by the user, and so forth.

As a verified presence tracking service accumulates data, it may become obvious that certain types of users and/or devices are reliable sources of location data. For example, users between the age of 25-35 with graduate degrees who post status messages to social networking or microblogging services 10 times per day may be more reliable sources of location data because their regular supplying of explicit location data provides a more reliable path through space time of their actual locations than users who provide or create less explicit location data. On the other hand, users over the age of 55 who rarely or never send emails, instant messages or post status messages may be less reliable sources of information. In all cases, a users co-location with a device such as a cellular telephone or computing device that has a passive sensing capability enables a means to track their location implicitly without any need for status or location updates explicitly from the user.

When a user first becomes known to a verified presence tracking service, the user could be assigned a default reliability, or, alternatively, could be typed by one or more factors associated with that user and assigned an initial reliability based on such a type. For example, users who regularly shut off their devices or who have a history of post-event editing of their location data may be given a lower reliability score based upon their explicit attention to passive location data being gathered on them and/or an established pattern of falsifying or editing passively gathered location data. Reliability may also relate to the number and sophistication of sources. For example, a user with three co-present mobile devices gathering passive location data is far more reliable than a user with only one such device. Uses with GPS-enabled devices are more reliable than those with only cell-tower level location granularity.

After sufficient amount of verified presence data is accumulated regarding a user, it may be possible to determine the reliability of a user as a source of location data empirically, which is to say, on the basis of data alone. Thus, for example, a user who is typologically within a group that is generally considered to be reliable, may be found to be unreliable. For example, a user between the age of 25-35 with a graduate degrees who posts status messages to social networking or microblogging services 10 times may habitually post misinformation regarding his or her location or lend his or her mobile devices to other users.

A sensor may be assigned to one or types based on any number of factors that describe the sensor. Such factors may include basic types of technology, such as GPS sensors, RFID sensors, short range wireless sensors using protocols such as the Bluetooth protocol, or biometric sensors. Such factors may include the sensor's brand, or model number, or whether the device is running trusted client software or untrusted client software. When a sensor first becomes known to a verified presence tracking service, the sensor could be assigned a default reliability, or, alternatively, could be typed by one or more factors associated with that sensor and assigned an initial reliability based on such a type.

After sufficient amount of verified presence data is accumulated regarding a specific sensor, it may be possible to determine the reliability of the sensor as a source of location data empirically. Thus, for example, a sensor that is typologically within a group that is generally considered to be reliable may be found to be unreliable. For example, a GPS sensor may be considered to be generally reliable, but a given user's device may contain a GPS sensor that is defective or whose operation is impaired by the device in which it is embedded.

A context may be assigned to one or more types based on any number of factors that describe the context. Such factors may include a general description of the surroundings, such as, for such types could include example characterizations of the environment based upon density or number of sources of data, e.g. rural, suburban and urban environments. Within a given environment, there may further degrees of differentiation, such as residential, commercial, urban canyon, and highway environments including and up to exact location data. Such factors may include a type of building or location, such as, for example, shopping mall, auditorium, bar or club, office building or hospital environments. Such factors could include other environmental factors, such as co-present users or devices, weather and so forth, A context may also be assigned to types using temporal factors, which could include, without limitation, a specific time of day, a general day division such as morning, afternoon and evening, a day of the week, a season of the year, a specific holiday, and so forth. A context may be assigned to types based on activities a user is engaged in which could include, without limitation, a concert, a sporting event, a class, dining, work or vacationing and so forth.

As a verified presence tracking service accumulates data, it may become obvious that certain types of contexts are more or less reliable sources of location data. For example, a context such as a user at work in a suburban environment on Wednesday afternoon may be a relatively reliable context. A context such as an urban canyon at rush hour on Friday in bad weather may be less reliable. A context such as a concert on a Saturday night may be even less reliable.

It is worth noting that the reliability of a user, sensor or context may exhibit temporal patterns of reliability. For example, a context relating to an urban canyon may be unreliable between 7 and 10 AM on weekdays, relatively reliable between 10 AM and 4 PM, unreliable between 5 and 7 PM on weekdays and very reliable on weekends. Such temporal patterns of reliability could be used to empirically type a user, sensor or context that has not been typed.

For example, suppose a given location, such as building, street, block or neighborhood is known to be within a city, but nothing else is known. If the reliability of location data is found to be unreliable between 7 and 10 PM and reliable between 10 AM and 4 PM on weekdays, it could be inferred that the location is in an urban canyon context. This can valuable if, for example, there is little data regarding the reliability of location data obtained from the area on weekends.

This example also demonstrates how reliability of a user, sensor or context could be determined using a combination of typological and empirical reliability where the reliability of the user, sensor or context varies temporally. In one embodiment, if sufficient data can be obtained to determine reliability of a given user, place or context during specific time periods, actual data will be the preferred method of determining reliability of the user, place or context, but during time periods having little or no actual data, reliability could be determined typologically.

As discussed above, types of contexts can exhibit significant temporal variations in reliability. Types of user and sensors may, however, also exhibit significant temporal variations in reliability. For example, mobile devices which utilize a mobile network that is prone to instability during peak load hours may exhibit significant temporal variations in reliability regardless of location. A user between the ages of 21-25 may become unreliable sources of information on Friday night after 8:00 PM regardless of location.

Location data relating to a user can, in certain cases, be obtained from a second user. For example, suppose a first and second user are at the same location. Suppose both devices support a short range wireless protocol such as Bluetooth. Suppose further that the second user's mobile device has a GPS sensor. The Bluetooth protocol sensor of the second user's mobile device could detect the presence of the first user's mobile device. The second user's mobile device could then associate the first user with the location provided by the GPS sensor of the device. Alternatively, or additionally, the second user could post a status message to a social networking site indicating the first user is in a specific location.

In such a case, one embodiment of a conceptual model for the reliability of location data could be stated as $$R_1 = C_L(P_1 S_1 \rightarrow P_2 S_2)$$

Where
 $R_1$ is the reliability of location data relating to User 1,
 $C_L$ is the reliability of the context in which the data is collected,
 $P_1$ is the reliability of User 1 supplying location data
 S1 is the reliability of the sensor associated with User 1 supplying location data
 $P_2$ is the reliability of User 1 supplying location data
 S2 is the reliability of the sensor associated with User 1 supplying location data Thus, the reliability of location data obtained from a second user regarding a first user can be a function of the reliability of both users and both sensors, as well as the context in which location data is obtained. This particular type of situation is noteworthy because location data obtained regarding a very unreliable source may be more reliable if it is obtained via a very reliable source.

The reliability of location data, in general can be verified in variety of ways. Three general categories of methods of verification are corroboration, currency and consistency. Location data is corroborated when essentially the same data is obtained regarding a location at a specific time from multiple sensors. Thus, for example, a user may have a cellular phone, a second mobile device having a GPS and may frequently post status messages to a microblogging site. Location data could be obtained from all three sources and compared. If all three sources agree more than some fixed percentage of the time, for example, 95%, location data from all three sources could be considered very reliable. If on the other hand, status messages rarely agree with GPS and cellular location data, then status messages could be considered unreliable, but if GPS and cellular location data are relatively similar, they may still be considered reliable sources of location data. If no source agree with one another, they could all be considered unreliable sources of location data.

Corroborating location data from reliable sources which are not under the control a user are an especially valuable source of corroboration. For example, if a user is identified in a public location by a public biometric sensor, it is strong, if not definitive, corroboration or refutation of location data obtained from the user's GPS device that places the user in the same location or a different location respectively. In another example, if a first user's mobile device is detected by a second user's mobile device, and the second user's mobile device has a reliable GPS device, location data from the second user's mobile device that places the first user in the same location as data from the first user's mobile device strongly corroborates the location data from the first user's device. Social status messages posted by a first user that places a second user in a location that agrees with location data obtained from sensors associated with a second user corroborates such data.

In the case of location data collected from a sensor in a user device, the data can be further corroborated if there is evidence that the user was actually with his sensing device at the time the location data was collected. For example, a user recently authenticating (e.g. providing login credentials) via his sensing device provides evidence that the user was actually with his device and can temporarily increase the confidence score for location data provided by that devicee. A user device that collects a user voice print when making a phone call at or near the time location data was collected can be corroborating data.

The reliability of location data can also be explicitly corroborated by a third party. In one embodiment, the reliability of the retrieved location data is based upon the certification of a sensor by a trusted source. In one embodiment, the reliability of the retrieved location data is based upon the certification of data obtained from a sensor by a trusted source.

The reliability of location data can be inferred from currency. Time elapsed between sensor input and a presence request will generally decrease confidence in a location. For example, a GPS upload from 7:30 PM will provide more evidence that a user was at a given location at 7:35 PM than will a GPS reading from 8:00 PM. Time between sensor data acquisition and data upload will also decrease confidence (increasing the likelihood of tampering with the data. For example, a GPS reading that was uploaded immediately is more likely to be reliable than a reading contained in a GPS log that was uploaded a week after the fact. In another example, a social status message recorded on Tuesday that identifies the location of a user the previous Saturday may be suspect.

The reliability of location data can be inferred from consistency. In one embodiment, Location data can be considered to be consistent if, on the whole, it exhibits temporal patterns of variation that are within expected patterns of behavior. Data that lays outside of such patterns of behavior may be considered as unreliable. For example, suppose a user typically commutes between San Jose and San Francisco most weekdays. If a user's location data places the user in San Francisco on Monday and Wednesday, and in the Philippines on Tuesday, the user's location data relating to the Philippines is suspect.

Note that the reliability of location data may vary by granularity of the location information. For example, location data based on the nearest cell tower to a cell phone may be extremely reliable as a source of data indicating the position of a user's cell phone at the level of a state or city, but be very unreliable in locating the street or building a user is in.

In one embodiment, a verified presence tracking system can continuously track and store location data relating to a large number of users and sensors and associate such data with one or more contexts having one or more context properties. Such data can be continuously analyzed to determine the reliability of users, sensors and contexts, both on an individual and typological level. Over time the presence tracking system will learn reliability scores for various sensors.

Those sensors that frequently provide data consistent with other sensors will be considered more reliable (leading to higher confidence scores associated with readings from those devices) while sensors that provide inconsistent results will have their reliability reduced. The notion of reliability can be propagated through users as well. Data from a user who owns a sensor that provides bad data will initially have low confidence while a new device from a reliable user will initially have higher reliability scores.

In one embodiment, a verified presence tracking service could collect additional data regarding users in additional to spatial and temporal data. For example, the service could collect social and topical data relating to users. For example, the system could mine social networking sites or user blogs to identify a given user's friends, profession, interests and hobbies. In one embodiment, the lives of users can be instrumented and referencing and cross-referencing data associated among users known to the system can be used to create and maintain a global presence graph that has the path and last known/current location in real-space mapped together relative for all known users. Within a global presence graph, a location can be a physical geographic coordinates or labels applied to bounded areas of space, but since this graph can also link to all related data, users can also be located in many virtual locations based upon online resources and/or topics/content sub-categories.

In one embodiment, a global presence graph can be used to compute actual and relative distances between users and location-reporting sensors. For example, a coffee shop with ten patrons may include 8 with 12 devices that are known to a verified presence tracking service, so its global graph maps these users, devices and sensors as co-present within a bounded physical location. A similar number of people may occupy a similar density at another location and not represent a bounded set, e.g. at a park where a large concert or festival is ongoing. A global presence graph can be used for scoring the reliability of location data based upon the availability or non-availability of a corroborating data source, and the graph can be used as the basis for selection and ranking of potential verification sources.

A verified presence tracking service can thus provide a large collection of location data related to a large number of users. Such location data has myriad applications. One type of application is a real time location request. In one type of location request, a first user may request the current location of a second user. In another type of location request, a first user could request verification that a second user is currently in a particular location. Such a request could be preferred in some cases, since it is less intrusive. For example, a user may only be allowed to listen to a set of music tracks if he or she is in a particular business location, but the business does not need to know the user's actual location if the user is not currently in the business.

In one embodiment, location request can also request historical location data. For example, a first user may request the location of a second user at a particular time, or through one or more ranges of times. In another example, a first user could request verification that a second user was in a particular location at a specific time of range of times. In another example, a first user could request verification that a second user was in a series of locations, either in a particular time order, or randomly. In general, a historical location verification request could specify a pattern of locations, some of which could be optional or required, and which could specify exact times or time ranges.

In any of the above embodiments, such location requests could specify a granularity (e.g. city, street, building or business, or, alternatively, a one mile radius, a four block radius or a ten foot radius.) Such could also specify a confidence, such as, for example, at least 50% likely the location is correct, at least 90% the location is correct, or near certainty (within the limits of the system) the location is correct.

A user's current or historical location information is potentially sensitive. While some users may be indifferent as to whether their location data is known to the general public, many, if not most users would prefer to restrict access to their location data to a limited set of users. A location tracking service could, in theory, be based on publicly available information, but is greatly enhanced if private or semiprivate data is gathered from user owned sensors and other sources. Such data may be very sensitive. In fact, a user may have serious safety concerns that they may be stalked or harassed by hostile individuals or organizations if their current and historical location data becomes publicly available.

In one embodiment, a verified presence tracking service only tracks private or semiprivate location data for users who have explicitly become members of such a service. Such a service could, optionally, also include publicly available location information for user and non-users of the service. In one embodiment, a verified presence tracking service can enable a user to set up preferences and access permissions that specify who should have access to the user's location data. Access rights can be set up as a white list or black list that specifies classes of other users, or individual users who are allowed or barred respectively from viewing another user's location data.

Access rights can define the granularity of location data that a user or class of users can access. For example, a user may allow all users to view the user's stated location, which as noted above, may or may not correspond to the users actual location. A user may allow coworkers or family members to determine what country, state or city the user is located in, but not an actual street or business. A user may allow close friends the user has defined to the verified presence tracking service to view the user's real time location, but not the user's location history. A user may allow a vendor to verify the user's location history to qualify the user for an online promotion, but prohibit the vendor from view any location data related to the user.

In one embodiment, a location request input to a verified presence tracking system can be given access to a user's location history based on a multifactor rating given to the request based on source and purpose. Such a rating can be based on the source of the request and the purpose of the request. For example, requests from spouses or family members can be rated higher than from friends, which can be rated higher than acquaintances, which can in turn be rated higher than from total strangers. Degrees of relationship between the users and acquaintances or strangers may also allow the useful classification and rating of sub-groups of users based upon the frequency, duration, number and quality of contacts or data associations between the requester and the subject of the request.

The purpose of a request may or may not be stated, so a default non-modified purpose can be assumed, while a user can create a list of prioritized purposes, processes or users whose requests are rated highly. For example, requests defined as "urgent" or "emergency" could be rated higher that requests defined as "work related" which could be rated higher that requests defined as "social contact" which could in turn be rated higher that "promotion verification."

The rating of a request can in turn define whether the request is processed or rejected. For example, an "emergency" request from a family member would likely be processed, whereas a "social contact" request from a stranger or acquaintance might be rejected. In one embodiment, the rating of a request could determine the granularity of location data made available to a requester. For example, a high rated request could be allowed to provide location data that can locate a user within a building or a small physical radius, such as 50 feet. A low rated request might only be given location data at a country, state or city level, or may only have access to a user's stated location.

Figure 2:
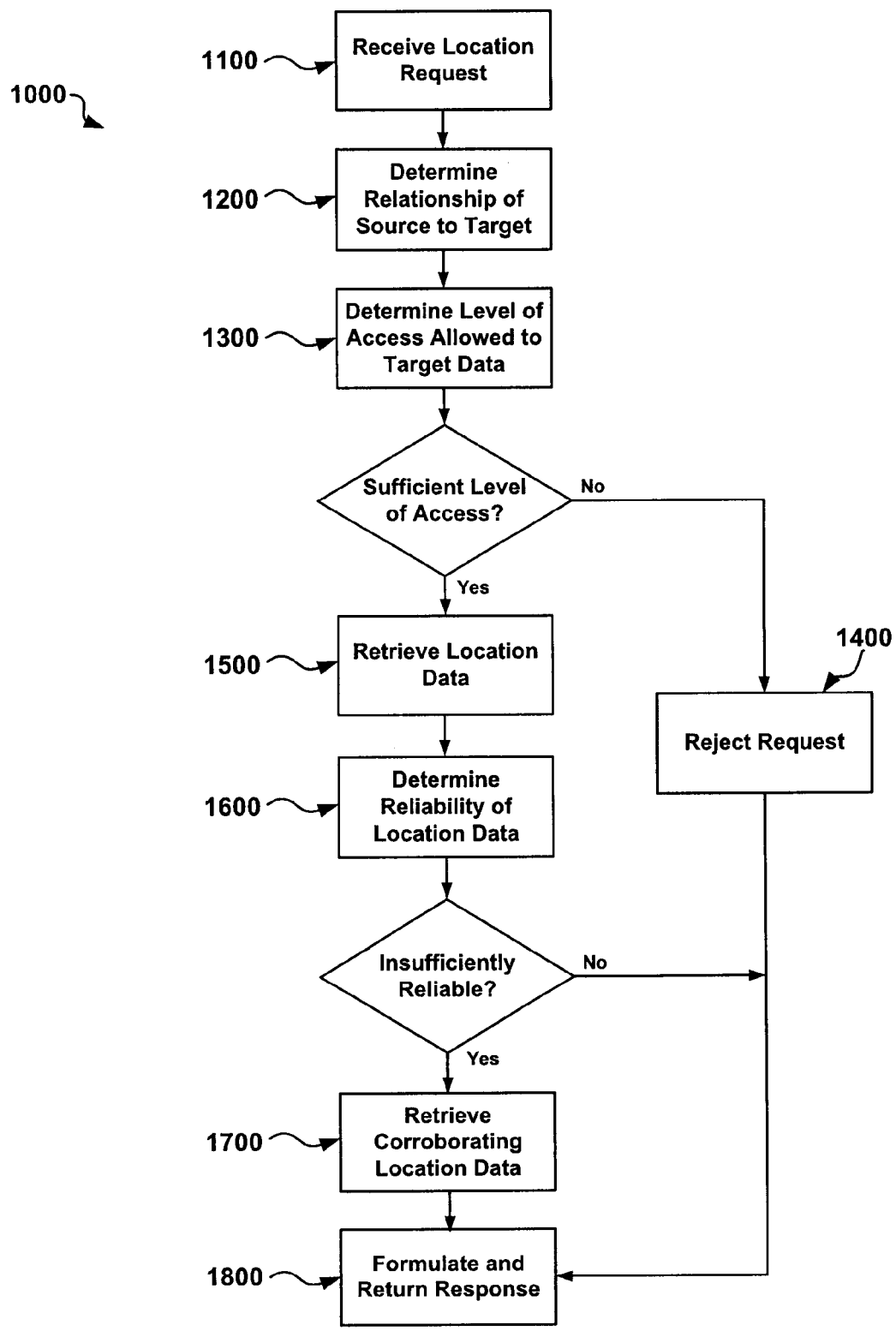
FIG. 2 illustrates one embodiment of a process for verified presence tracking using at least one embodiment of the system disclosed herein.

FIG. 2 illustrates one embodiment of a process 1000 for verified presence tracking using at least one embodiment of the system disclosed herein.

A request for a location is received 1100, over a network, such as the Internet. The request may have been transmitted from a user, an organization or a system using any conventional methodology for transmitting information over a network, such as data entered through a web form, transmitted using a custom API, an email, or an instant message. In one embodiment, the request comprises a request type, a request source and a request target. In one embodiment, the request may additionally comprise one or more request parameters.

In one embodiment, the request types can include a request type for a target's location and a request type to verify a target's location. The request source could comprise an identification of an individual user (i.e. a user), an identification of a business entity, such as a product manufacturer or distributor, or an identification of any other type of entity having an interest in location data such as a law enforcement or security agency. The source could comprise an identification of another system, such as, for example, an advertising revenue system.

The request target could comprise an identification of an individual user (i.e. a user), although the target could be any kind of object or entity that can be associated with locational data. For example, such an entity could be a corporate resource used by many users, such as a company cell phone or laptop. Such an entity could be a group of individual users. The request target could also comprise an identification of a group of two or more individuals. Where the request type of a multiple target location request is a location request, the request is essentially equivalent to two or more separate location requests. Where the request type of a multiple target location request is a location verification request, all specified targets must satisfy the terms of the request The request parameters can include a variety of options depending on the request type, source and target. In the case of a request type to verify a target's location, the request parameter can include one or more spatial parameters that comprise an identification of a location or list of locations. The identification of the location could be in any format necessary to express the location at a level of granularity required by the request, such as a state, city, a building or a business location.

Request parameters can include one or more temporal parameters that specify a time or time range or a list of times or time ranges for a location request. A temporal request parameter could specify a real-time request, or a request for the most recent known location for a target. A temporal request parameter could specify a historical date and time, a range of historical dates and times or a list of such dates and times. A temporal request parameter could specify a time or date offset, a holiday or an event or any other data that can be resolved to an absolute date and time or date and time range.

In the case of a request type to verify a target's location where the request parameter include spatial parameters that comprise an identification of a list of locations, each location in the list of locations can be associated with one or more temporal request parameters. Note that a list of locations with times can, together, define a pattern of behavior that can be used for many purposes. For example, such a pattern could be used to verify a user's participation in a promotion. Such a pattern could also be used to identify abnormal patterns of behavior, e.g. a pattern that indicates a person may have been abducted.

In one embodiment a request to verify a target's location could be a request by an advertiser for verification that a target has satisfied the terms of a commercial incentive where the request parameters specifies the terms of the commercial incentive. The terms of the commercial incentive could include terms that specify one or more locations, times and activities that the target must satisfy in order to qualify for the commercial incentive.

In one embodiment a request to verify a target's location could includes at least one additional user where the purpose of the request is to verify that the target and the additional users are or were co-located. Such a request could additionally include at a specific location and time or a list of locations and times.

Request parameters can include one or more parameters that define the purpose of the request. In one embodiment, users can create list of prioritized purposes, processes or users whose requests are rated highly. For example, requests defined as "urgent" or "emergency" could be rated higher that requests defined as "work related" which could be rated higher that requests defined as "social contact" which could in turn be rated higher that "promotion verification."

Request parameters can include one or more parameters explicitly indicating the granularity required for the request. For example, the request could specify a parameter requesting location data at a country, state, city, street, a business or building or an exact GPS location. The granularity stated in the request could be a preferred granularity, or a required granularity. The granularity of the request may be implied based on other parameters. For example, an "emergency" request could imply the highest level of granularity available. The required granularity could be implied in a location verification request by the level of granularity of the requested location (e.g. state, city or building.)

Request parameters can include one or more parameters explicitly indicating the reliability of data required for the request. For example, the request could specify a parameter requesting location data that where there is a 90% confidence the data is correct. The reliability stated in the request could be a preferred reliability, or a required reliability. The reliability of the request may be implied based on other parameters. For example, an "emergency" request could imply the highest level of reliability available. The required reliability could be implied in a location verification request by the level of granularity of the requested location, where, for example, a request for data at a state or city level need not be retrieve location data that is as reliable as that needed for a request at a building level.

All request parameter could additionally be assigned default values if they are not explicitly entered. For example, a default temporal parameter could be the current date and time (i.e. real-time), a default purpose could be "inquiry." A default granularity could "best available" where the best available granularity reflects the most detailed data the source is allowed to access (and not necessarily the most detailed data available on the system.) A default reliability could be "best available" representing the most reliable data (which may not be very reliable in some cases) that is currently known to a location verification system.

The relationship of the request source to the request target is then determined 1200. In one embodiment, the source and the target are members of a verified presence tracking service and the relationship between the source and the target is known to the service. In one embodiment, the relationships between the target and the source could include, without limitation, "spouse", "parent", "child", "employer", "employee", "agent", "client", "self", "friend", "relative", "acquaintance", "coworker", "vendor" or "advertiser" or "sponsor." In one embodiment, users explicitly define their relationships with other users. In one embodiment, the relationships between users is automatically mapped by analyzing available data sources such as user emails, user BLOGs, user social network profiles and user status messages. In one embodiment, the relationship between the source and the target can be verified by the target before a request is processed. The relationship could be verified by the user in real-time via, for example, emails, instant messages or any other medium that can enable a user to respond to an inquiry. In one embodiment, the relationship between the source and the target can be automatically verified by a device associated with the target.

The level of access the source is allowed to the target's location data is then determined 1300. In one embodiment, the target has defined access privileges on a verified presence tracking services. In one embodiment, access privileges are defined for types of relationships such as "friend", "coworker" and "stranger", and can additionally be defined for specific users or groups of users. In one embodiment, access privileges specify the level of granularity of location data a user to which a user has access. In one embodiment, lists of users, groups of users or relationships could be placed on a whitelist that have defined access rights to a user's location data, and all other users have no access rights. In one embodiment, lists of users or groups of users could be placed on a blacklist such that such users are denied access rights or given reduced access rights even if the relationship of the source to the target would ordinarily imply access to the target's location data.

In one embodiment, requests could be rated using a multi-factor rating given to the request based on source and purpose. For example, requests from spouses or family members can be rated higher than from friends, which can be rated higher than acquaintances, which can in turn be rated higher than from total strangers. Requests defined as "urgent" or "emergency" could be rated higher that requests defined as "work related" which could be rated higher that requests defined as "social contact" which could in turn be rated higher that "promotion verification."

In one embodiment, the rating of a request be used to determine whether a request is processed at all, and what granularity of location data the to which the source will be allowed access. For example, a high rated request could be allowed to provide location data that can locate a user within a building or a small physical radius, such as 50 feet. A low rated request might only be given location data at a country, state or city level, or may only have access to a user's stated location or may be allowed no access whatsoever to a target's location data.

In one embodiment, access privileges could be defined separately for location requests and location verification requests. As discussed above, a location verification request is potentially less intrusive than a location request, since if a target is not or was not at a specified location at a specified time, the source will not be given the target's location. In one embodiment, access privileges could be defined separately for real-time and historical location data requests. As discussed above, a real-time location request is potentially less intrusive than a historical location request since a real-time request only reveals a current location, whereas a historical request can provide a detailed plot of a user's activities over time.

If the source does not have sufficient access permission to access the target's location data at the request's required level of granularity, the request is rejected 1400. As discussed above, every request will be associated with an explicit, implied or default required granularity. Many requests may simply be for "best available" location data, which is the most detailed level of location data to which the source has access. If a specified granularity of a request is a preferred granularity and the source does not have access to location data for a target at that level of detail, the target receives can receive data at a "best available" level, and can thus be processed.

In at least one embodiment, steps 1200 through 1400 as described above are optional. In one embodiment, all users of the service are authorized to view location data for all other users. In one embodiment, a user of the service is only authorized to view location data for a target when the target expressly consents to allow the user to view the target's location data.

Location data related to the request is then retrieved 1500 from one or more location data sources. In one embodiment, location data is retrieved from one or more databases of location data maintained by a verified presence service that retrieves location data from sensor networks, communication networks and other location data sources. In one embodiment, the verified presence tracking service collects additional data regarding users in additional to spatial and temporal data and references and cross-references data associated among users known to the system to create a global presence graph that has the path and last known/current locations in real-space mapped together relative for all known users. In one embodiment, the global presence graph can be used to retrieve location data relating to a target.

Alternatively, in one embodiment, real-time location data could be retrieved from a network of sensors from sensor networks, communication networks and other location data sources in real-time. In one embodiment, real-time location data and data retrieved from one or more databases could be combined. In one embodiment, real-time and historical location data could be retrieved from a third-party location data source.

The reliability of the retrieved location data is then determined 1600. In one embodiment, for each location data point, the reliability of the users and the sensors involved in collecting the data is identified and the reliability of the context under which the data was collected is identified. In one embodiment, the reliability of users, sensors and contexts can be determined empirically or typologically, and may vary temporally.

In one embodiment, location data can be further evaluated for corroboration, consistency, and currency as discussed in detail above. In one embodiment, a global presence graph maintained by a verified presence tracking system can be used to identify corroborating data, evaluate the consistency of location data for users over time and determine the currency of location data.

In one embodiment, the reliability of location data is determined when a location request is received. In one embodiment, the reliability of location data collected and stored by a verified presence tracking system is continuously determined at or near the time the data is collected.

If the reliability of the location data is insufficient to satisfy the terms of the request, additional corroborating data is retrieved 1700.

In one embodiment, a verified presence tracking service may not continuously retrieve location data from all possible sources. This may be for a variety of reasons. For example, a given sensor, such as a biometric sensor, may not be able to continuously recognize every user that comes within range of the sensor. This may be because of, without limitation, processing limits inherent in the sensor or bandwidths limit within the network to which the sensor is connected. Certain corroborating data sources might have a high cost of data acquisition such as, for example, sources for data acquisition that requires the efforts of another user to collect.

In one embodiment, a verified presence tracking service acquires data from a hierarchy of sensors, where location data is continuously acquired from a first group of sensors that have a low cost of data acquisition, such as, for example, data automatically acquired directly from GPS sensors associated with a user device or mobile phone location data acquired from a mobile network. Where a location request requires a higher level of reliability than is provided by data collected from the first group of sensors, data may be acquired from one or sensors in a second group of sensors that are used for obtaining corroborating data.

Sensors within the second group could comprise fixed sensors, such as biometric sensors, cameras, microphones, RFID tracking sensors and so forth, that data from which data can be automatically acquired. Sensors within the second group could also comprise mobile sensors associated with a user known to the system. Such sensors could include, without limitation mobile devices carried by a user such as mobile phones, PDA, cameras, voice recorders, and so forth. Acquisition of data from mobile sensors could be entirely automatic. For example, if it is desired to verify the location of a first user who has a mobile phone that supports a short range wireless protocol, the location of the first user's mobile phone could be verified by requesting a second user's mobile phone that supports the same short range wireless protocol to attempt to locate the first user's mobile phone.

In some cases, acquisition of corroborating location data could involve steps requiring a user to take a specific action. For example, if a verified presence tracking service has reason to believe that a first user whose location is to be verified may be within the visual range of a second user, the service could send a message to a mobile device associated with the second user asking the second user if he or she can see the first user. Such a message could be communicated in any manner suited to the second user's mobile device, such as a text message or email to which the second user can reply. The verified presence tracking service could also request the second user to take some other action that would provide data suitable to verify the first user's location, such as taking a picture of the first user or taking a voice recording of or near the first user.

In one embodiment, a global presence graph maintained by a verified presence tracking services comprises the last known location of all users, sensors associated with such users, and the location of all fixed sensors known to the service. In one embodiment, a global presence graph can be used to compute actual and relative distances between users and location-reporting sensors. For example, a coffee shop with ten patrons may include 8 with 12 devices that are known to the service, so its global graph maps these users, devices and sensors as co-present within a bounded physical location.

In one embodiment, the verified presence service rates the reliability of all sensors known to the service. In one embodiment, when a verified presence tracking service is attempting to obtain corroborating data for the location of a user, the service can select one or more sensors based on the sensor's proximity to the location which is to be verified and the reliability of the sensor.

In one embodiment, if a first user or a first user's device supplies corroborating location data for a second user, the first user can be rewarded for consistent and reliable responses to such requests or reduced in reputation or reliability rating for failing to respond or for reports that later are proved likely to have been false (or fraudulent.) In some embodiments, verification sources may be monetarily compensated while in others received points, scoring, or increases to a reputation or reliability rating.

A response is then formulated and transmitted to the request source 1800. The content of the response will depend on the type of the request. A request for a location will return a description of a location. In one embodiment, the description of the location can be at the requested level of granularity if the source is permitted to view location data at that level of granularity and such data is available. If a source is not permitted to view data at that level of granularity, the location data description can provide a location description at the level of granularity the source is permitted to view. If location data is not available at the requested (or default) level of granularity, the location data can be provided at the best available level of granularity. The response can additionally include a reliability or confidence score for the location data. If more that more location is displayed, or if a location is displayed for a time range as a series of time slices, confidence or reliability scores can be displayed for each location or time slice.

A request to verify a location can return a simple "verified" or "not verified." Alternatively, more information can be provided such as "no information available" or "information indicates target was in another location." The verification message could also contain a confidence score that the target is or was in a location at a specific time.

Figure 3:
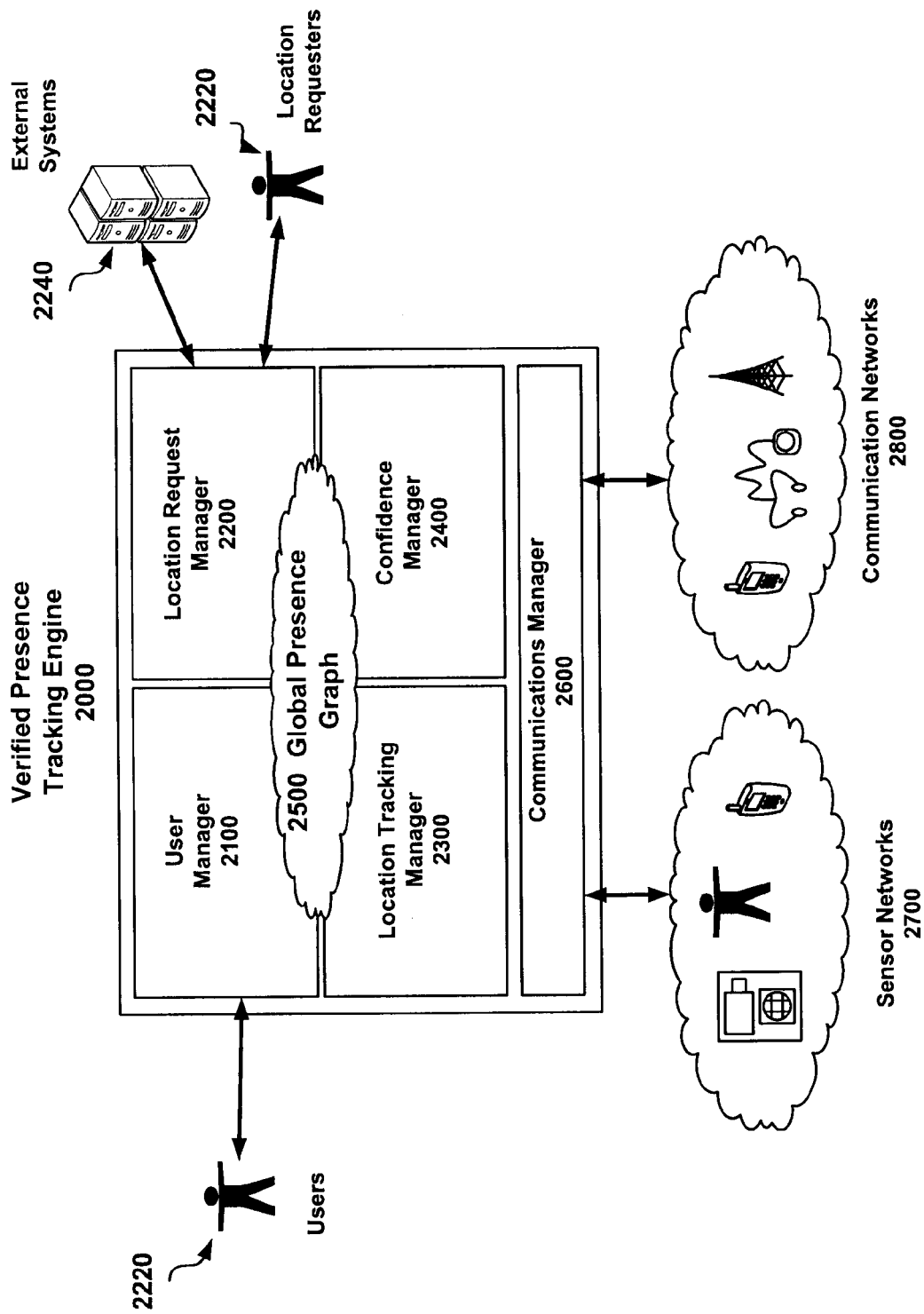
FIG. 3 illustrates one embodiment of a verified presence tracking engine capable of supporting at least one embodiment of the process described in FIG. 2.

FIG. 3 illustrates one embodiment of a verified presence tracking engine 2000 capable of supporting at least one embodiment of the process described in FIG. 2 above. In one embodiment, the verified presence tracking engine 2000 comprises a User Manager 2100, a Location Request Manager 2200, a Location Tracking Manager 2300. a Confidence Manager 2400 and a Communications Manager 2600. In one embodiment, the verified presence tracking engine 2000 is hosted on one or more servers hosted by a verified presence tracking service such as the service 100 shown in FIG. 1.

In one embodiment, the User Manager 2100 provides facilities that enable users or other entities, such as business organizations, to become users 2120 of the system. The User Manager 2100 can allow users to set up user profiles that can include user demographic information and preferences, define user devices that can serve as sources of location data for the user, and third party websites, such as social networking sites and microblogging sites, that can serve as additional sources of data relating to the user and the user's location. In one embodiment, the User Manager 2100 can provide a web enabled interface to users, such as a website comprising one or more HTML pages. In one embodiment, the User Manager 2100 can provide an API that enables software running on user devices to access facilities provided by the User Manager.

In one embodiment, the User Manager 2100 can provide facilities that enable a user to define the user's contacts and the users relationships to such contacts. Such relationships could include categories such as "friend", "relative", "acquaintance", "coworker", "vendor" or "advertiser." In one embodiment, the User Manager 2100 automatically identifies a user's contacts and categorizes the user's relationships with such contacts by analyzing available data sources such as user emails, user BLOGs, user social network profiles and user status messages.

In one embodiment, the User Manager 2100 can provide facilities that enable a user to define access privileges to the user's location data. Access privileges could be defined for the user's contacts individually, or could be defined by categories of relationships. In one embodiment, access privileges specify the level of granularity of location data a user to which a user has access.

In one embodiment, lists of users, groups of users or relationships could be placed on a whitelist that have defined access rights to a user's location data, and all other users have no access rights. In one embodiment, lists of users or groups of users could be placed on a blacklist such that such users are denied access rights or given reduced access rights even if the relationship of the source to the target would ordinarily imply access to the target's location data.

In one embodiment, access privileges could be defined separately for location requests and location verification requests. In one embodiment, access privileges could be defined separately for real-time and historical location data requests In one embodiment, the Location Request Manager 2200 can provide facilities to receive and respond to requests for location data and location verification from location requesters 2220 and external systems 2240 that have an interest in location data. In one embodiment, the Location Request Manager is configured to receive location requests comprising a request type, a request source, a request target and, optionally, one request or more request parameters. In one embodiment, the Location Request Manager 2200 can provide a web enabled interface to users, such as a website comprising one or more HTML pages. In one embodiment, the Location Request Manager 2200 can provide an API that enables software running on user devices to access facilities provided by the Location Request Manager.

In one embodiment, the request types can include a request type for a target's location and a request type to verify a target's location. The request source could comprise an identification of a individual user (i.e. a user), an identification of a business entity, such as a product manufacturer or distributor, or an identification of any other type of entity having an interest in location data such as a law enforcement or security agency. The source could comprise an identification of another system, such as, for example, an advertising revenue system.

The request target could comprise an identification of an individual user (i.e. a user), although the target could be any kind of object or entity that can be associated with locational data. For example, such an entity could be a corporate resource used by many users, such as a company cell phone or laptop. Such an entity could be a group of individual users. The request target could also comprise an identification of a group of two or more individuals. Where the request type of a multiple target location request is a location request, the request is essentially equivalent to two or more separate location requests. Where the request type of a multiple target location request is a location verification request, all specified targets must satisfy the terms of the request The request parameters can include a variety of options depending on the request type, source and target. Such parameters could include: spatial parameters that comprise an identification of a location or list of locations, temporal parameters that specify a time or time range or a list of times or time ranges, parameters that define the purpose of the request, parameters explicitly indicating the granularity required for the request and parameters explicitly indicating the reliability of data required for the request. Such parameters are discussed in detail above in the description of process step 1100. All request parameter could additionally be assigned default values if they are not explicitly entered.

In one embodiment, the Location Request Manager 2200 is further configured to determine, for each location request, the relationship between the source and the target using relationships defined and maintained by the target user using facilities provided by the User Manager 2100. Where no defined relationship exists, a default relationship such as "stranger" or "unknown" could be used.

In one embodiment, the Location Request Manager 2200 is further configured to determine the level of access a source is allowed to a target's location data using access privileges defined by the target user through facilities provided by the User Manager 2100. In one embodiment, requests could be rated using a multifactor rating given to the request based on source and purpose as discussed in detail above, and the level of access allowed to the source the level of access a source is allowed to a target's location data is determined using the rating. If the source of a location request does not have sufficient access authority to access the target's location data at the request's required level of granularity, the request the Location Request Manager 2200 rejects the request and can further send a rejection message to the request source.

In one embodiment, if the source of a location request has sufficient access authority to access the target's location data at the request's required level of granularity, the Location Request Manager 2200 requests the target's location data from the Location Tracking Manager 2300 at a required level of reliability. In one embodiment, the Location Request Manager 2200 receives location data and location reliability data from the Location Tracking Manager 2300 relating to location tracking requests and formulates and transmits responses to such location tracking requests to the requesting sources.

The content of the response will depend on the type of the request. A request for a location will return a description of a location. In one embodiment, the description of the location can be at the requested level of granularity if the source is permitted to view location data at that level of granularity and such data is available. If a source is not permitted to view data at that level of granularity, the location data description can provide a location description at the level of granularity the source is permitted to view. If location data is not available at the requested (or default) level of granularity, the location data can be provided at the best available level of granularity. The response can additionally include a reliability or confidence score for the location data. If more than one location is displayed, or if a location is displayed for a time range as a series of time slices, confidence or reliability scores can be displayed for each location or time slice.

Location Request Manager 2200 can return a can return a simple "verified" or "not verified" response to a request to verify a location. Alternatively, more information can be provided such as "no information available" or "information indicates target was in another location." The verification message could also contain a confidence score that the target is or was in a location at a specific time.

In one embodiment, communications between the Location Request Manager 2200 and requesting users can be encrypted at an appropriate level of encryption based on the source and the targets security needs. In one embodiment, communications between the Location Request Manager 2200 and requesting users can be conducted on a secure channel.

In one embodiment, the Location Tracking Manager 2300 continuously or periodically retrieves location data relating to users registered through the User Manager 2100 from one or more location data sources using the facilities of the Communications Manager 2600. Such location sources sensor networks 2700, communication networks 2800 and other location data sources such as third party location data providers. In one embodiment, the Location Tracking Manager 2300 stores retrieved location data on one or more databases. In one embodiment, the verified presence tracking service collects additional data regarding users in addition to spatial and temporal data and references and cross-references data associated among users known to the system to create a global presence graph that has the path and last known/current locations in real-space mapped together relative for all known users.

In one embodiment, the Location Tracking Manager 2300 responds to requests from the Location Request Manager 2200 for location data relating to target users and returns the location data along with reliability scores for the data to the Location Request Manager 2200. In one embodiment, the Location Tracking Manager 2300 retrieves location data from one or more databases of location data maintained by the Location Tracking Manager 2300. In one embodiment, a global presence graph maintained by the Location Tracking Manager 2300 can be used to retrieve location data relating to a target.

Alternatively, in one embodiment, real-time location data could be retrieved in real-time from a network of sensors from sensor networks, communication networks and other location data sources using the facilities of the Communications Manager 2600. In one embodiment, real-time location data and data retrieved from one or more databases could be combined. In one embodiment, real-time and historical location data could be retrieved from a third-party location data source.

In one embodiment, the Location Tracking Manager 2300 requests reliability scores from the Confidence Manager 2400 for specific location data when it is responding to a request from the Location Request Manager 2200 for location data relating a target user. In one embodiment, the reliability of the location data retrieved by the Location Tracking Manager 2300 is continuously evaluated by the Confidence Manager 2400 and reliability scores can be stored in a database accessible to the Location Tracking Manager 2300 or the Confidence Manager 2400 or both. In one embodiment, reliability scores are stored along with location data in a global presence graph 2500 maintained by the Location Tracking Manager 2300.

In one embodiment, the Confidence Manager 2400 assigns reliability scores to data retrieved by the Location Tracking Manager 2300. In one embodiment, the Confidence Manager 2400 scores the reliability of data retrieved by the Location Tracking Manager 2300 only when specifically requested to do so by the Location Tracking Manager. In one embodiment, the reliability of the location data retrieved by the Location Tracking Manager 2300 is continuously evaluated by the Confidence Manager 2400 at or near the time the data is collected.

In one embodiment, the Confidence Manager 2400 determines the reliability of the users and the sensors involved in collecting location data and further determines the reliability of the context under which location data was collected. In one embodiment, the reliability of users, sensors and contexts can be determined empirically or typologically, and may vary temporally.

In one embodiment, the Confidence Manager 2400 can enable a system level user to manually define the reliability of types of users, types, and contexts where empirical reliability data is not available. Users, sensors and contexts representing types unknown to the Confidence Manager 2400 can be assigned a default reliability. In one embodiment, the Confidence Manager 2400 is configured to continuously or periodically evaluate the reliability of users, sensors and contexts and types of users, sensors and contexts using location data retrieved by the Location Tracking Manager 2300.

In one embodiment, Confidence Manager 2400 empirically determines the reliability of location data retrieved by the Location Tracking Manager 2300 by evaluating the data for corroboration, consistency, and currency as discussed in detail above. In one embodiment, a global presence graph maintained by a verified presence tracking system can be used to identify corroborating data, evaluate the consistency of location data for users over time and determine the currency of location data.

In one embodiment, when the Location Tracking Manager 2300 requests reliability scores from the Confidence Manager 2400 relating to location data, the Location Tracking Manager 2300 can additionally specify a preferred or required level of reliability for the data. If the Confidence Manager 2400 determines the reliability of the location data is insufficient to satisfy the terms of the request, Confidence Manager 2400 can attempts to retrieve additional corroborating data using facilities provided by the Communications Manager 2500.

In one embodiment, the Confidence Manager 2400 can attempt to retrieve, additional corroborating data from sources not normally used by the Location Tracking Manager 2300. Such sources could include fixed sensors, such as biometric sensors, cameras, microphones, RFID tracking sensors and so forth, that data from which data can be automatically acquired. Such sources could also include mobile sensors associated with a user known to the system. Such sensors could include, without limitation mobile devices carried by a user such as mobile phones, PDA, cameras, voice recorders, and so forth.

The Confidence Manager 2400 could acquire data from mobile sensors automatically. For example, if it is desired to verify the location of a first user who has a mobile phone that supports a short range wireless protocol, the location of the first user's mobile phone could be verified by requesting a second user's mobile phone that supports the same short range wireless protocol to attempt to locate the first user's mobile phone.

The Confidence Manager 2400 could acquire corroborating location data using facilities provided by the Communications Manager 2500 involving steps requiring a user to take a specific action. For example, if the Confidence Manager 2400 has reason to believe that a first user whose location is to be verified may be within the visual range of a second user, the Confidence Manager 2400 could send a message to a mobile device associated with the second user asking the second user if he or she can see the first user. The Confidence Manager 2400 could also request the second user to take some other action that would provide data suitable to verify the first user's location, such as taking a picture of the first user or taking a voice recording of or near the first user.

In one embodiment, if a first user or a first user's device supplies corroborating location data for a second user, Confidence Manager 2400 could reward the first user for consistent and reliable responses to such requests or reduced in reputation or reliability rating for failing to respond or for reports that later are proved likely to have been false (or fraud). In some embodiments, verification sources may be monetarily compensated while in others a points, scoring, reputation or reliability rating.

In one embodiment, the Confidence Manager 2400 can be configured to constantly designate, track and update a list of immediately available verification sources, including overseeing any terms associated with use of that source. As users locations change and corroborating sources come and go, the Confidence Manager 2400 can maintains a prioritized list of contact information for verification sources. For example, monetarily compensated verification sources may, for example, be given a higher certification rating that non-monetarily compensated sources because of the additional protections against fraud in commerce created by that transaction.

The Communications Manager 2500 serves as the Verified Presence Tracking Engine's interface to sensor 2700 and communications networks 2800 and supplies location data relating to registered users to the Location Tracking Manager 2300 and the Confidence Manager 2400.

Note that internationally, the collection, storage and dissemination of location data is heavily regulated in some jurisdictions. As such, the physical configuration of a Verified Presence Tracking Service and a Verified presence Tracking Engine as shown in FIG. 1 and FIG. 3 may need to be adapted to regulatory constraints. In some cases, location data may need to be sourced from third party providers authorized by a target jurisdiction. In some cases, sensors from which location data may be acquired, locations from where location data may be acquired, transmission paths for location data, points where location data is stored, and points where location data is cached may need to be fine-tuned to meet regulatory requirements.

Note that a Location Tracking Engine 2000 with limited functionality could also be implemented as a self-contained PIM application or process for only handling a user's own location requests relating only to the user's devices, e.g. synchronization and cross-platform applications or interdevice communication.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising the steps of:
receiving, over a network, a request for a location, the request comprising a request type, a request source and a request target;
retrieving, over the network, location data relating to the request target from a plurality of location data sources;
determining, using a computing device, the reliability of the retrieved location data, such that determining the reliability of the retrieved location data comprises identifying corroborating data available over the network, evaluating the consistency of location data using the corroboration data for the request target over time and determining the currency of the retrieved location data;
formulating, using the computing device, a response, such that the formulated response is based on the request type, the retrieved location data, and the determined reliability of the retrieved location data; and
transmitting the response, over the network to the request source.

2. The method of claim 1 wherein the request for a location additionally comprises a request parameter specifying a required reliability of the retrieved location data, wherein if the reliability of the retrieved location data is less than the required reliability of the retrieved location data, the method additionally comprising:
retrieving, over a network, corroborating location data relating to a request target from a corroborating location data source.

3. The method of claim 2 wherein the corroborating location data source is a device wherein the device detects the presence of the request target at a location.

4. The method of claim 3 wherein the device is selected from the list: cellular phone, mobile computing device, appliance, vehicle, building and sensor.

5. The method of claim 2 wherein the corroborating location data source is a user known to the system other than the request target, wherein the user verifies the presence of the request target at a location.

6. The method of claim 1 wherein the request type indicates the request is a request for verification that the request target is located at a location and the request for a location additionally comprises a request parameter that specifies the location,
wherein if the request target is located at the location, the response comprises information that verifies the request target is located at the location.

7. The method of claim 1 wherein the request type indicates the request is a request for verification that the request target was located at a location and the request for a location additionally comprises a request parameter that specifies the location and a request parameter that specifies a time,
wherein the retrieving step retrieves location data relating to a request target at the specified time, and
wherein if the request target was located at the location at the specified time, the response comprises information that verifies the request target was located at the location at the specified time.

8. The method of claim 7 wherein the request for a location additionally comprises an additional user
wherein the retrieving step retrieves location data relating to the request target and the additional user at the specified time, and
wherein if the request target and the additional user were located at the location at the specified time, the response comprises information that verifies the request target and the additional user were located at the location at the specified time.

9. The method of claim 1 wherein the request type indicates the request is a request for verification that the request target was located at a location and the request for a location additionally comprises a request parameter that specifies a plurality of locations and times
wherein the retrieving step retrieves location data relating to the request target at the plurality of specified times, and
wherein if the request target was located at the plurality of locations at the respective times, the response comprises information that verifies the request target was located at the plurality of locations at the respective times.

10. The method of claim 1 wherein the request source is an advertiser, and request type indicates the request is a request for verification that the request target has satisfied the terms of a commercial incentive, wherein a request parameter specifies a term of the commercial incentive;
   wherein the retrieving step retrieves location data relating to the term of the commercial incentive;
   wherein if the request target has satisfied the term of the commercial incentive, the response comprises information that verifies the request target has satisfied the term of the commercial incentive.

11. The method of claim 1 wherein the request type indicates the request is a request for location data, and the response comprises a representation of location data relating to the request target.

12. The method of claim 1 wherein the request type indicates the request is a request for location data, and the request for a location additionally comprises a request parameter that specifies a time,
   wherein the retrieving step retrieves location data relating to the request target at the time, and
   wherein the response comprises a representation of location data relating to the request target at the time.

13. The method of claim 1 wherein the request type indicates the request is a request for location data, and the request for a location additionally comprises a request parameter that specifies a required location data granularity,
   wherein the response comprises a representation of location data relating to the request target displayed at the required location data granularity.

14. The method of claim 13 wherein if location data relating to the request target is not available at the required location data granularity, the location data relating to the request target is displayed at the best available data granularity the source is permitted to view.

15. The method of claim 1 wherein reliability of the retrieved location data is determined by comparing the consistency of location data measurements from each of the plurality of location data sources relating to the request target to one another.

16. The method of claim 1 wherein the reliability of the retrieved location data is determined by comparing the time the location data was retrieved from each of the plurality of location data sources with a time the location data was collected by the respective location data source.

17. The method of claim 1 wherein the retrieved location data comprises a plurality of measurements made by a sensor, wherein the reliability of the retrieved location data is determined by determining the reliability of the sensor.

18. The method of claim 1 wherein the retrieved location data comprises a plurality of measurements made by a sensor, wherein the reliability of the retrieved location data is determined by determining the reliability of the sensor and the reliability of a person associated with the sensor.

19. The method of claim 18 wherein the reliability of the retrieved location data is further determined by determining the effect of a context under which each of the measurements was collected, wherein the context comprises a time, place and environment under which the respective measurement was taken.

20. The method of claim 19 wherein the context additionally comprises an activity the request target was engaged in when the respective measurement was taken.

21. The method of claim 1 wherein the retrieved location data comprises a plurality of measurements made by a sensor, wherein the reliability of the retrieved location data is based upon the certification of the data by a trusted source.

22. The method of claim 1 wherein the retrieved location data comprises a plurality of measurements made by a sensor, wherein the reliability of the retrieved location data is based upon the certification of the sensor by a trusted source.

23. A method comprising the steps of:
   receiving, over a network, a request for a location, the request comprising a request type, a request source and a request target;
   determining, using a computing device, the relationship of the request source to the request target;
   determining, using the computing device, a level of access to location data the source is allowed relative to the request target, the determining of the level utilizing the relationship of the request source to the request target as part of the determination;
   retrieving, over the network, location data relating to a request target from a plurality of location data sources;
   determining, using the computing device, the reliability of the retrieved location data, such that determining the reliability of the retrieved location data comprises identifying corroborating data available over the network, evaluating the consistency of location data using the corroboration data for the request target over time and determining the currency of the retrieved location data;
   formulating, using the computing device, a response, such that the formulated response is based on the request type, the retrieved location data, and the determined reliability of the retrieved location data; and
   transmitting the response, over the network to the request source.

24. The method of claim 23 wherein the level of access to location data the source is that allowed relative to the request target determines the granularity of the representation of location data relating to the request target in the response.

25. The method of claim 23 wherein the relationship between the source and the request target was defined by the request target prior to the time the request for location data was received.

26. The method of claim 23 wherein the relationship between the source and the request target is verified by the request target.

27. The method of claim 23 wherein the relationship between the source and the request target is verified by a device associated with the request target.

28. The method of claim 25 wherein the relationship between the source is one of a predefined group of relationship types.

29. The method of claim 28 wherein the predefined group of relationship types comprises a plurality relationship types, each relationship type of the plurality of relationship types being selected from the list: spouse, parent, child, employer, employee, agent, client, self, friend, relative, acquaintance, coworker, advertiser and sponsor.

30. The method of claim 29 wherein the level of access to location data the source is that allowed relative to the request target is determined by the type of the relationship between the source and the request target, wherein the type of relationship determines the granularity of location data relating to the request target the source is permitted to view.

31. The method of claim 23 wherein the request for a location additionally comprises a request parameter that specifies a request purpose, wherein the request purpose is used to determine the level of access to location data the source is that allowed relative to the request target.

32. The method of claim 23 wherein the request type indicates the request is a request for location data, and the request for a location additionally comprises a request parameter that specifies a required location data granularity, wherein, if the level of access the source is allowed relative to the request target indicates the source is not permitted to view the location data relating to the request target at the specified required level of granularity, the request is rejected, and wherein the response comprises a representation of location data relating to the request target displayed at the required location data granularity.

33. A system comprising:
a processor;
a non-transitory storage medium for tangibly storing thereon program logic for execution by the processor, the program logic comprising:
location request manager logic for receiving, over a network, requests for a location, each request comprising a respective request type, a respective request source and a respective request target;
location tracking manager logic for retrieving, over a network, for each request for a location received by the location request manager logic, location data relating to the respective request target from a plurality of location data sources;
confidence manager logic for determining the reliability of location data retrieved by the location tracking manager logic, such that determining the reliability of location data comprises identifying corroborating data available over the network, evaluating the consistency of location data using the corroboration data for the respective request target over time and determining the currency of the location data,
such that the location request manager logic is further configured to formulate a response to each request for a location using location data retrieved by the location tracking manager logic, the formulated response based on the respective request type, the respective retrieved location data, and the respective determined reliability of the retrieved location data, and
such that location request manager logic is further configured to transmit responses formulated for each request for a location to the request's respective source.

34. The system of claim 33 wherein the location request manager logic is further configured to determine, for each request for a location, the respective relationship of the respective request source to the respective request target and wherein the location request manager logic is further configured determine for each request for a location, a respective level of access to location data the respective source is allowed relative to the respective request target, the determining of the level utilizing the respective relationship of the respective request source to the respective request target as part of the determination.

35. The system of claim 33 wherein at least some of the requests for a location received by the location request manager logic additionally comprises a respective request parameter specifying a respective required reliability of the respective location data, wherein if the respective reliability of the retrieved location data is less than the respective required reliability of the respective retrieved location data, the confidence manager logic is additionally configured to retrieve, over a network, respective corroborating location data relating to respective request target from a respective corroborating location data source, wherein the respective corroborating location data source is a device of a user known to the system other than the respective request target, wherein the device detects the presence of the respective request at a respective location.

36. The method of claim 35 wherein a corroborating location data source is a user known to the system other than the respective request target, wherein the user verifies the presence of the respective request target at the respective location.

37. A non-transitory computer-readable storage medium for tangibly storing thereon computer-readable instructions for a method comprising:
receiving, over a network, a request for a location, the request comprising a request type, a request source and a request target;
retrieving, over a network, location data relating to the request target from a plurality of location data sources;
determining the reliability of the retrieved location data, such that determining the reliability of the retrieved location data comprises identifying corroborating data available over the network, evaluating the consistency of location data using the corroboration data for the request target over time and determining the currency of the retrieved location data;
formulating a verified presence response, the formulated response based on the request type, the retrieved location data, and the determined reliability of the retrieved location data; and
transmitting the response, over the network, to the request source.

38. The non-transitory computer-readable storage medium of claim 37 wherein the request for a location additionally comprises a request parameter specifying a required reliability of the retrieved location data, wherein if the reliability of the retrieved location data is less than the required reliability of the retrieved location data, the method additionally comprises
retrieving, over a network, corroborating location data relating to the request target from a corroborating location data source.

39. The non-transitory computer-readable storage medium of claim 37 wherein the corroborating location data source is a device, wherein the device detects the presence of the request target at a location.

40. The non-transitory computer-readable storage medium of claim 37 wherein the corroborating location data source is a user known to the system other than the request target, wherein the user verifies the presence of the request target at a location.

41. The method of claim 1 wherein the location data relating to the request target is retrieved utilizing a global presence graph that has the path and last known and current locations in real-space mapped together relative for users known to the network.

42. The method of claim 1 wherein the identifying corroborating data available over the network, evaluating the consistency of location data for the request target over time and determining the currency of the retrieved location data utilizes a global presence graph that has the path and last known and current locations in real-space mapped together relative for users known to the network.

* * * * *